United States Patent
Heine et al.

(10) Patent No.: US 9,678,740 B2
(45) Date of Patent: Jun. 13, 2017

(54) MIGRATION MECHANISM

(71) Applicant: SAP SE, Walldorf (DE)

(72) Inventors: Frank Heine, Walldorf (DE); Volker Driesen, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/872,935

(22) Filed: Oct. 1, 2015

(65) Prior Publication Data
US 2017/0097818 A1    Apr. 6, 2017

(51) Int. Cl.
G06F 9/44    (2006.01)
G06F 9/445   (2006.01)
H04L 29/08   (2006.01)
G06F 17/30   (2006.01)
G06F 3/06    (2006.01)

(52) U.S. Cl.
CPC ............ G06F 8/65 (2013.01); G06F 3/0647 (2013.01); G06F 17/303 (2013.01); H04L 67/34 (2013.01)

(58) Field of Classification Search
CPC ........ G06F 8/65; G06F 3/0647; G06F 17/303; H04L 67/34
See application file for complete search history.

(56) References Cited

U.S. PATENT DOCUMENTS

| | | | | |
|---|---|---|---|---|
| 5,129,082 A | * | 7/1992 | Tirfing | G06F 17/30067 |
| 2008/0028395 A1 | * | 1/2008 | Motta | G06F 8/65 |
| | | | | 717/177 |
| 2012/0144379 A1 | * | 6/2012 | Tsai | G06F 8/71 |
| | | | | 717/170 |
| 2016/0170717 A1 | * | 6/2016 | Zoch | G06F 8/71 |
| | | | | 717/110 |

* cited by examiner

Primary Examiner — Camquy Truong
(74) Attorney, Agent, or Firm — Schwegman Lundberg & Woessner, P.A.

(57) ABSTRACT

Methods, systems, and computer program products for enabling software upgrades and migrations are described. A selection of one or more software entities is generated and a target product vector is defined based on the selection of one or more software entities. A start component vector is computed based on a landscape of a source system and a target component vector is computed based on the start component vector and target product vector. A determination of whether a component of the target component vector is a successor of a selected component of the start component vector is made and one or more migration files are generated comprising the target product vector and the target component vector based on the determination.

17 Claims, 15 Drawing Sheets

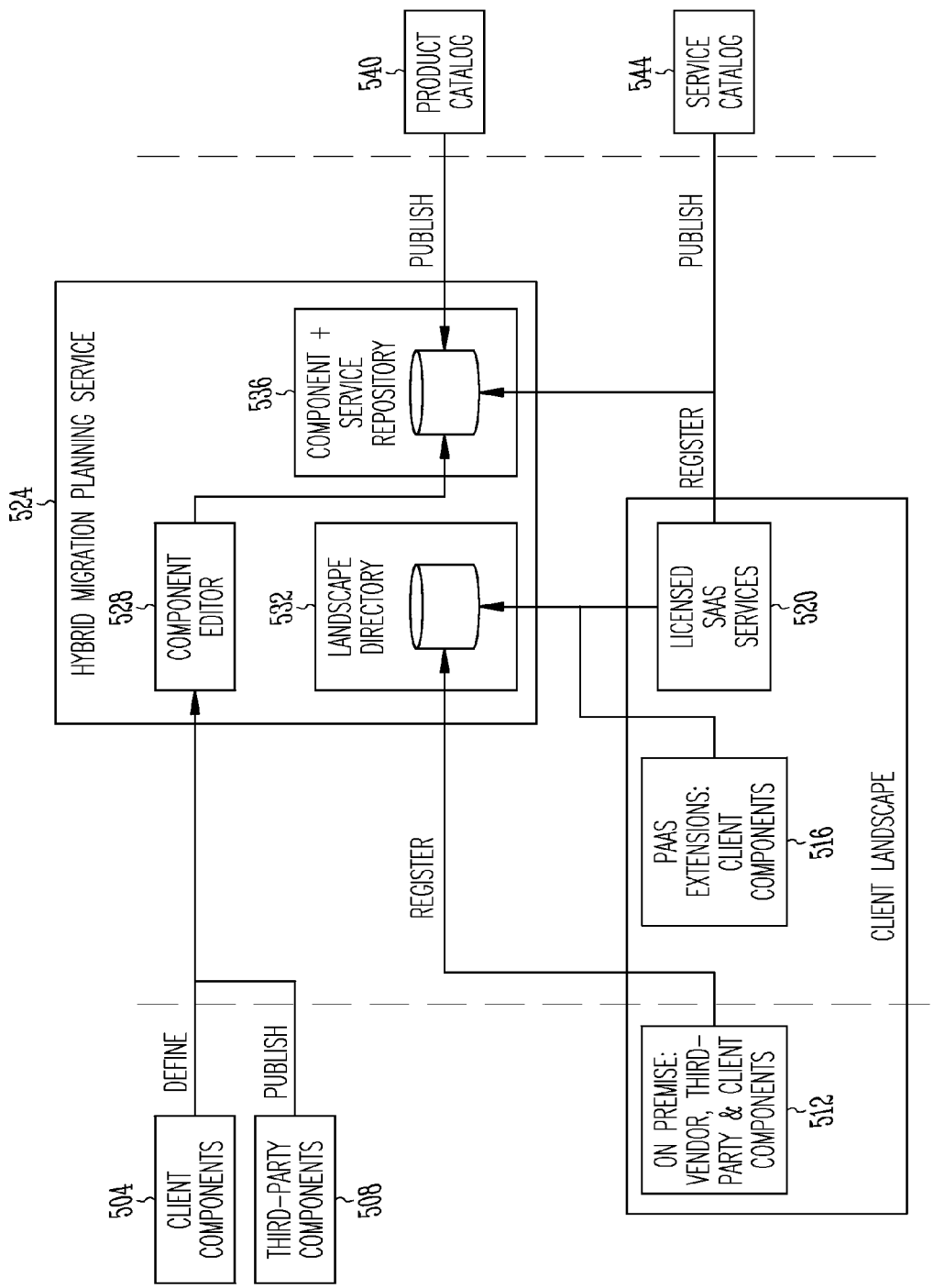

MIGRATION MECHANISM

FIELD

The present disclosure relates generally to a mechanism for enabling system upgrades and migrations. In an example embodiment, the disclosure relates to migrating software in an integrated software and service environment.

BACKGROUND

Application integration is an important component of meeting the needs of business applications. The networked solutions concept addresses this challenge by, for example, providing pre-defined and auto-configured integration services for common business scenarios that may be accessible via a network. A number of services (solutions) may be networked together and provided as an integrated landscape. The landscape may include on-premise software, software as a service, and the like. Maintenance and upgrades to the landscape environment can be a complex issue. The migration to a new landscape environment can similarly involve complex issues that require complex planning.

BRIEF DESCRIPTION OF DRAWINGS

The present disclosure is illustrated by way of example and not limitation in the figures of the accompanying drawings, in which like references indicate similar elements and in which:

FIG. 5 is a low-level block diagram of an example landscape environment, in accordance with an example embodiment;

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for performing software upgrades and/or migrations are described. In one example embodiment, a hybrid migration planner provides a mechanism that enables users to migrate to a new landscape environment. The landscape environment may include on-premise software, software as a service (SaaS), platform as a service (PaaS), and the like. The hybrid migration planner evaluates deployment and runtime dependencies of components, such as software components, to develop a migration plan to a target system and may be provided as a central service in a cloud environment. In one example embodiment, the hybrid migration planner generates configuration files to configure customer systems, cloud systems, and the like. The deployment dependencies may be related to a required version of a platform for a software component, a required version(s) of one or more inter-related software components, and the like. The runtime dependencies may be related to, for example, a version of JAVA® that is not appropriate for the target system (e.g., not compatible with one or more associated software components or services).

The disclosed methods, systems, apparatus, and computer program products may be universally applicable independent of deployment models and client technologies, and may be suited for heterogeneous networked solution landscapes. In one example embodiment, any number of networked solutions, any type of deployment model (such as on premise, in cloud, and the like), and any client technology (such as native desktop client, browser interface, mobile application, and the like) may be utilized in the landscape environment.

The on-premise applications may be configured to execute on a server connected to a private network accessible by a customer associated with one of the multiple individual landscapes. The cloud applications may be provided by a service provider via, for example, a public network, such as the Internet. In one example embodiment, a landscape in the landscape directory that is associated with a particular customer may identify customer-specific (e.g., executing on customer-dedicated servers) and shared applications (e.g., executing on cloud-based servers) that the particular customer can access and use.

Figure 1:
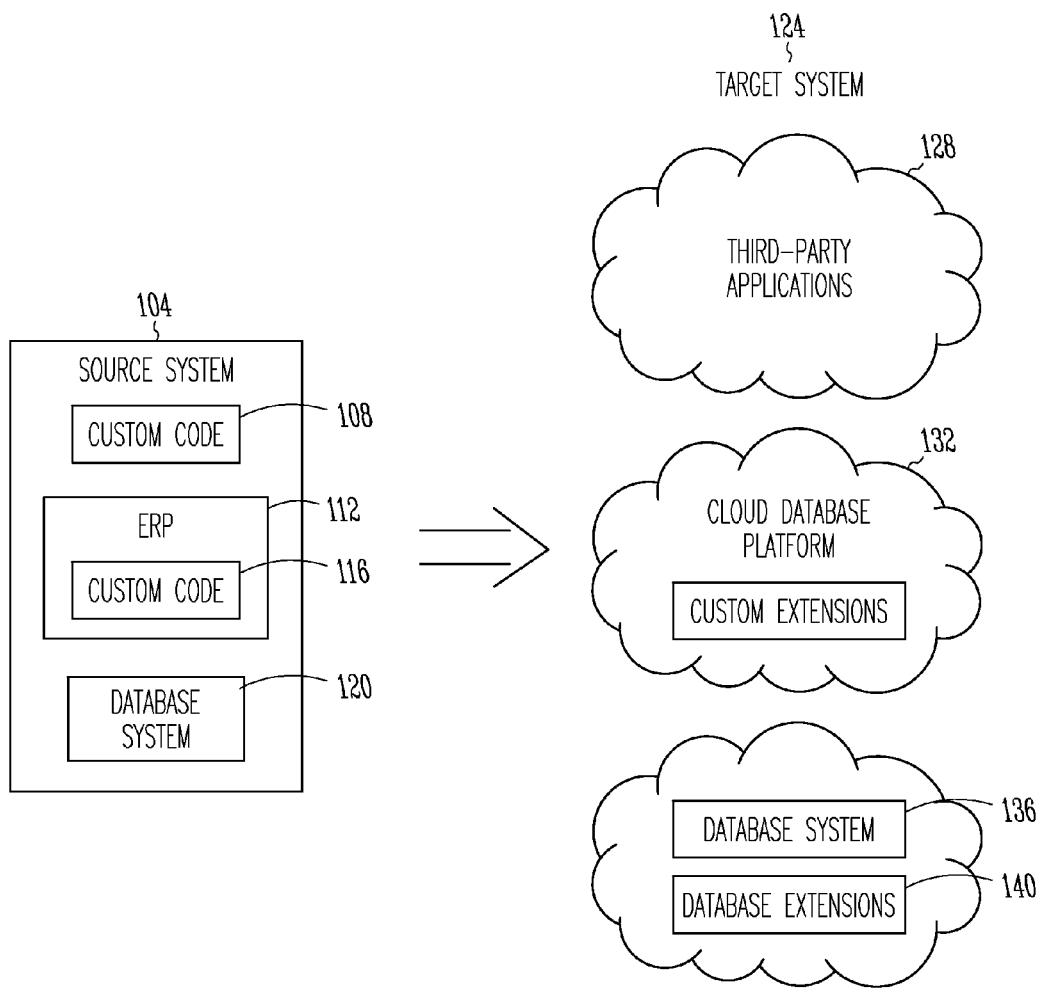
FIG. 1 is a graphical representation of a proposed migration, in accordance with an example embodiment.

FIG. 1 is a graphical representation of a proposed migration, in accordance with an example embodiment. In one example embodiment, a source system 104 (e.g., a customer system) comprises software 108 (including third-party applications, custom code, and the like) that is owned or licensed to the customer, an enterprise resource planning system 112 (with optional custom code 116), and one or more database systems 120. The source system 104 may be a system located on the premise of the customer.

The target system 124 is a landscape environment that is to be migrated to. The target system 124 may comprise third-party applications 128, a cloud database platform 132, and a database system 136. The third-party applications 128 represent, for example, applications that are provided as services in a cloud environment. Examples include Ariba®, Concur®, Hybris®, Fieldglass®, and the like. The third-party applications 128 may include customer extensions that allow a customer to customize a corresponding service to meet the particular needs of the customer for that service.

The cloud database platform 132 is a cloud platform comprising a database system. The applications of the cloud database platform 132 may also include custom extensions that allow, for example, a customer to customize the corresponding service to meet the particular needs of the customer. The database system 136 may be implemented on a customer system and/or on a cloud platform. The database system 136 may also include database extensions 140 that allow, for example, a customer to customize a database interface to meet the needs of the customer.

In order to transition from the source system 104 to the target system 124, a definition of the target system 124 is obtained and the source system 104 is analyzed to determine the components that are in need of upgrade, services that need to be added, and the like, as described more fully below. The target system 124 is implemented and configured, and a migration plan is created to specify the steps needed to transition from the source system 104 to the target system 124. The specified plan can then be executed to transition from the source system 104 to the target system 124.

The methods, systems, apparatus and computer program products described herein may further also enable the development and implementation of monitoring and administration tools for cloud-based business solutions, and may further support lifecycle management and monitoring tools to monitor executing solutions.

In one example embodiment, the disclosed methods include registering an application in at least one landscape in a landscape directory. The registration may include providing information on at least one of, for example, location information to identify a network location of the application, release and version information for the application, usage type for the application, role information for the application, and the like.

Figure 2:
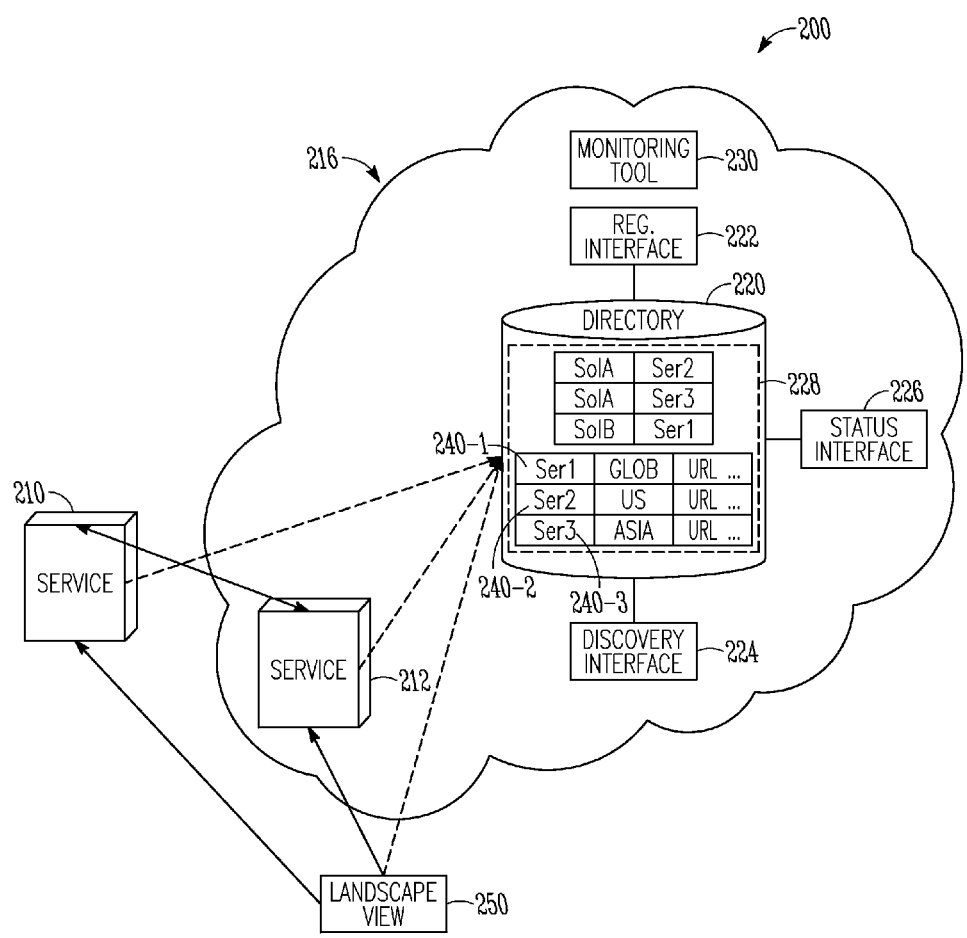
FIG. 2 illustrates a schematic diagram of an example landscape environment including a landscape directory, in accordance with an example embodiment.

FIG. 2 illustrates a schematic diagram of an example landscape environment 200 including a landscape directory 220, in accordance with an example embodiment. The landscape environment 200 may include multiple service applications (also referred to as "networked services"), such as networked services 210, 212 that may be distributed over a network and may be accessed by customers to process customers' requests and tasks. The networked services 210, 212 may be hosted by multiple distributed servers that are interconnected via a network (such as the public Internet, private networks, virtual private networks, and the like). The networked services 210, 212 may be on-demand applications (e.g., applications that levy a charge based on use of the applications by customers), or conventional distributed applications that customers may have licenses for. In one example embodiment, at least one of the service applications (e.g., service application 212) may be a cloud-based application configured for cloud processing and may be available for use by multiple customers. In one example embodiment, other systems and applications, such as the software 108, the third-party applications 128, the cloud database platform 132, the database system 136, and the like may be included in the landscape environment 200 of FIG. 2. Although two networked services 210, 212 are depicted in FIG. 2, any number of services, applications, platforms, and the like may be used.

As further depicted in FIG. 2, the landscape environment 200 may include a landscape view 250. The landscape view 250 may be an instance/component of a monitoring tool, such as a monitoring tool 230, and may provide a holistic overview of landscape(s) involved in a cloud solution(s). The landscape view 250 may enable viewing the data maintained in the landscape directory 220. Additional application services may be invoked to get more detailed information about the system landscape(s).

The landscape directory 220 may enable automatic connection of pre-defined and pre-developed components (e.g., components that include other applications and tools) of systems, including customer-specific systems, on-demand systems, and the like. Such system management functionality may be enabled, at least in part, through use of a bundle of interfaces to provide customers access to the customers' shared and private landscape data in the landscape directory 220. Thus, in one example embodiment, the landscape directory 220 may be configured to maintain individual landscape data for various customers, where each landscape defines a customer's individual system, e.g., the identity of a set of applications. For example, landscape data for one customer may define that customer's landscape as including networked services 210, 212, while another customer's landscape data may define that customer's system as including only service application 212. In one example embodiment, the landscape directory 220 may be implemented on one or more storage devices (which may be distributed), and may be managed or controlled by a commercial or customized data management application. The landscape directory 220 may be on premise (and thus may be run from a customer's on-premise system or sub-system) or may be run from an on-demand platform using an application (e.g., a directory software application) as a service in hosted mode.

Landscape data in the landscape directory 220 may also include data that defines the connectivity between various applications, and may define separate connectivity configurations for the various customers that use the identified applications. For example, the landscape data may set which services may communicate with each other (e.g., to transfer data, requests, commands, and the like), whether service applications may automatically initiate peer-to-peer communications with other service applications without seeking a customer's input, and the like.

Landscape data maintained in the landscape directory 220 may further comprise registration information for the various service applications 210, 212, including basic information pertaining to the service applications 210, 212, such as the location of service applications 210, 212 (provided, for example, as a uniform resource locator (URL) and the like), the release version of the service applications 210, 212, the applications' role(s) (e.g., human capital management applications, customer relationship management applications, and the like), usage type (e.g., whether the application is used for testing or in the course of production), price/charge information, and the like. In one example embodiment, registration information for a service application 210 or 212 maintained in the landscape directory 220 may be provided via an interface (e.g., a registration interface 222). The registration information may be provided by the services and/or may be provided, under some circumstances, by the customer(s) (e.g., in situations in which the system to be registered is a test system). In one example embodiment, the registration information may be included in each of the individual landscapes for the various multiple customers where the respective service applications 210, 212 are listed, and/or may be maintained in the landscape directory 220 as a global data record (providing information for the respective applications).

The landscape directory 220 may also be accessed through a discovery interface 224 that enables customers to retrieve information, such as the registration information. Information retrieved via the discovery interface 224 may thus be used by customers to subscribe to additional service applications 210, 212 with respect to service applications 210, 212 whose registration information was retrieved via the discovery interface 224, and to modify and/or edit a customers' landscape data (e.g., add or delete particular service applications 210, 212, change landscape configurations, and the like).

The landscape directory 220 may also maintain access data pertaining to the accessibility of the service applications 210, 212. The access data may be communicated to the landscape directory 220 via, for example, a status interface 226 and/or the registration interface 222. Access data may include, for example, status and availability information for the various service applications 210, 212. Access data may be received from administrators (e.g., an administrator of the cloud, of private networks connected to the cloud, of the service applications 210, 212 available on the cloud, and the like), from the service applications 210, 212 themselves, and/or from customers. Examples of access data may include status/availability information, information as to whether service applications 210, 212 are active, information as to whether downtime is scheduled for any service application 210, 212, lifecycle status information, and other such information. Lifecycle status information may include an indication of whether the service application 210, 212 has been released, is obsolete, has been replaced by another service application 210, 212, and the like.

As shown in FIG. 2, landscape data, including registration data, access data, and the like, may be arranged in data records that are stored in the customers' (or tenants') individual landscape(s) in the landscape directory 220. For example, the landscape directory 220 may include an example landscape 228 which may include multiple records defining the associated customer's system (any number of records may be included in a given landscape 228). The example landscape 228 may be stored in a logical area in memory allocated to store data for that landscape 228.

For example, FIG. 2 shows three records 240-1 through 240-3 included within the landscape 228 that hold information, such as registration information, for the service applications 210, 212 depicted in FIG. 2. The record 240-1 may include information such as the identity of the service application 210, namely service 1 (the abbreviation for the networked service 210), an indication that the networked service 210, 212 may include region or country-specific data, and information about the location of the networked service 210, 212 (e.g., its URL). In this case, service 1 may include data from anywhere in the globe. Any of the records 240-1 through 240-3 may include additional data, including status/availability information, other types of registration information, and the like. Additional information that may be included in at least some of the records 240-1 through 240-3 may be the business usage of the system (e.g., customer relationship management (CRM), or human capital management (HCM) systems).

In one example embodiment, a collection of several callable services may be bundled together to define a solution for which there may be a record in a landscape. Defining a bundle of services in the landscape directory 220 as a solution may enable monitoring customers' systems at a "solution-level" and not just at a "service level."

Figure 3:
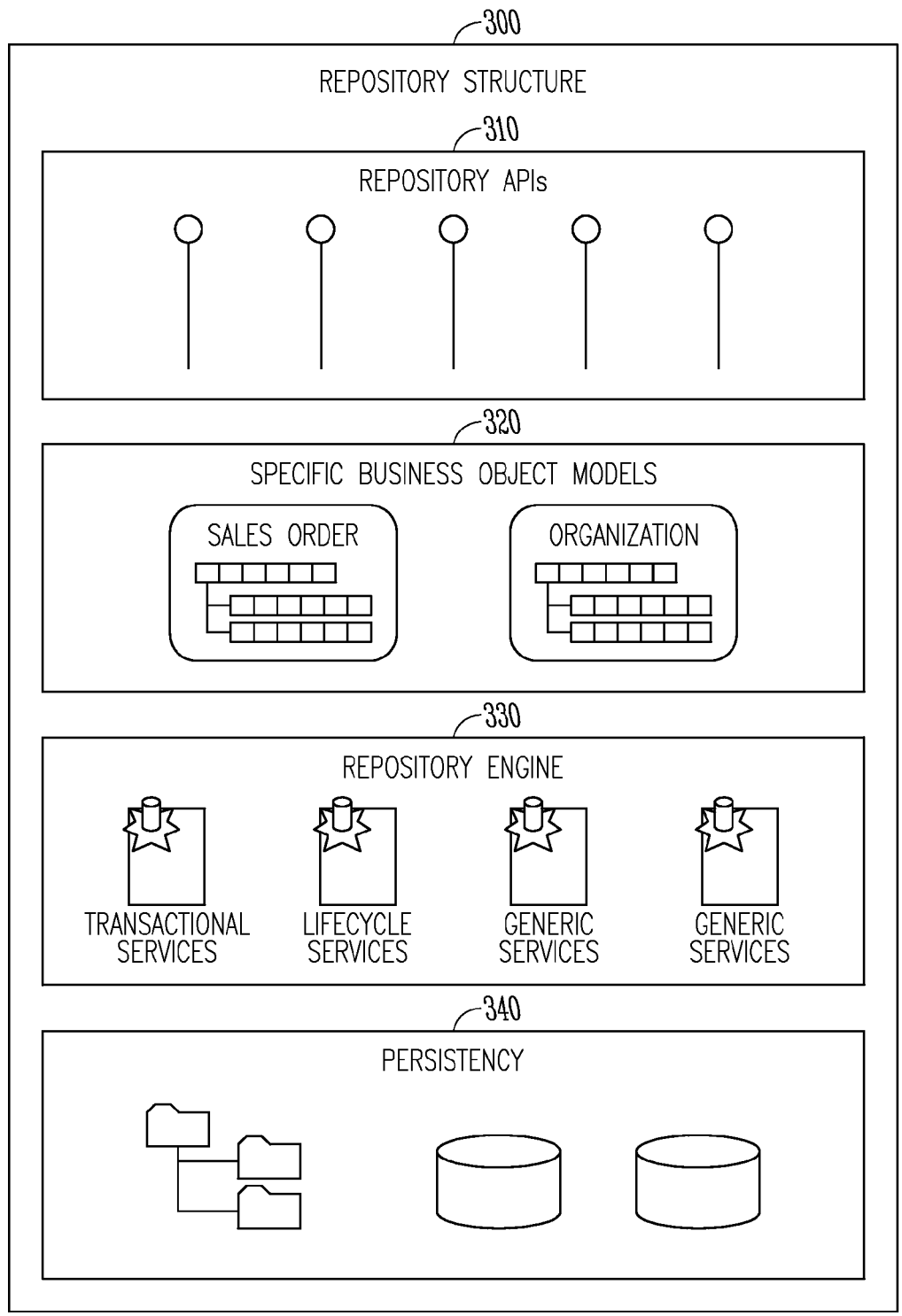
FIG. 3 illustrates an example repository architecture for supporting the use of example business object models and instances thereof, in accordance with an example embodiment.

FIG. 3 illustrates an example repository structure 300 for supporting the use of example business object models and instances thereof, in accordance with an example embodiment. The repository structure 300 may comprise a business process platform such as the Application Platform provided by SAP of Walldorf, Germany.

The repository structure 300 may include application programming interfaces 310 which may provide read and write access to business object instances. The business object instances accessed via application programming interfaces 310 may be instances of specific business object models 320. Each of the specific business object models 320 may comprise metadata describing a specific business object model 320, or class.

A repository engine 330 may include transactional services to create and administrate business object instances, and to provide lifecycle services to manage business object instance lifecycles. Some services of the repository engine 330 may provide the access to business object instances exposed by application programming interfaces 310. The business object instances themselves may be stored in a persistency 340, which may comprise any suitable type(s) of structure(s).

In one example embodiment, each of the specific business object models 320 may conform to a generic business object model (i.e., a meta-metadata model). As a result, the same application programming interfaces 310, the services of the repository engine 330, and the persistency 340 may be used for all instances of the specific business object models 320. The foregoing synergies may facilitate the use of object instances of any newly-developed specific business object model.

Figure 4:
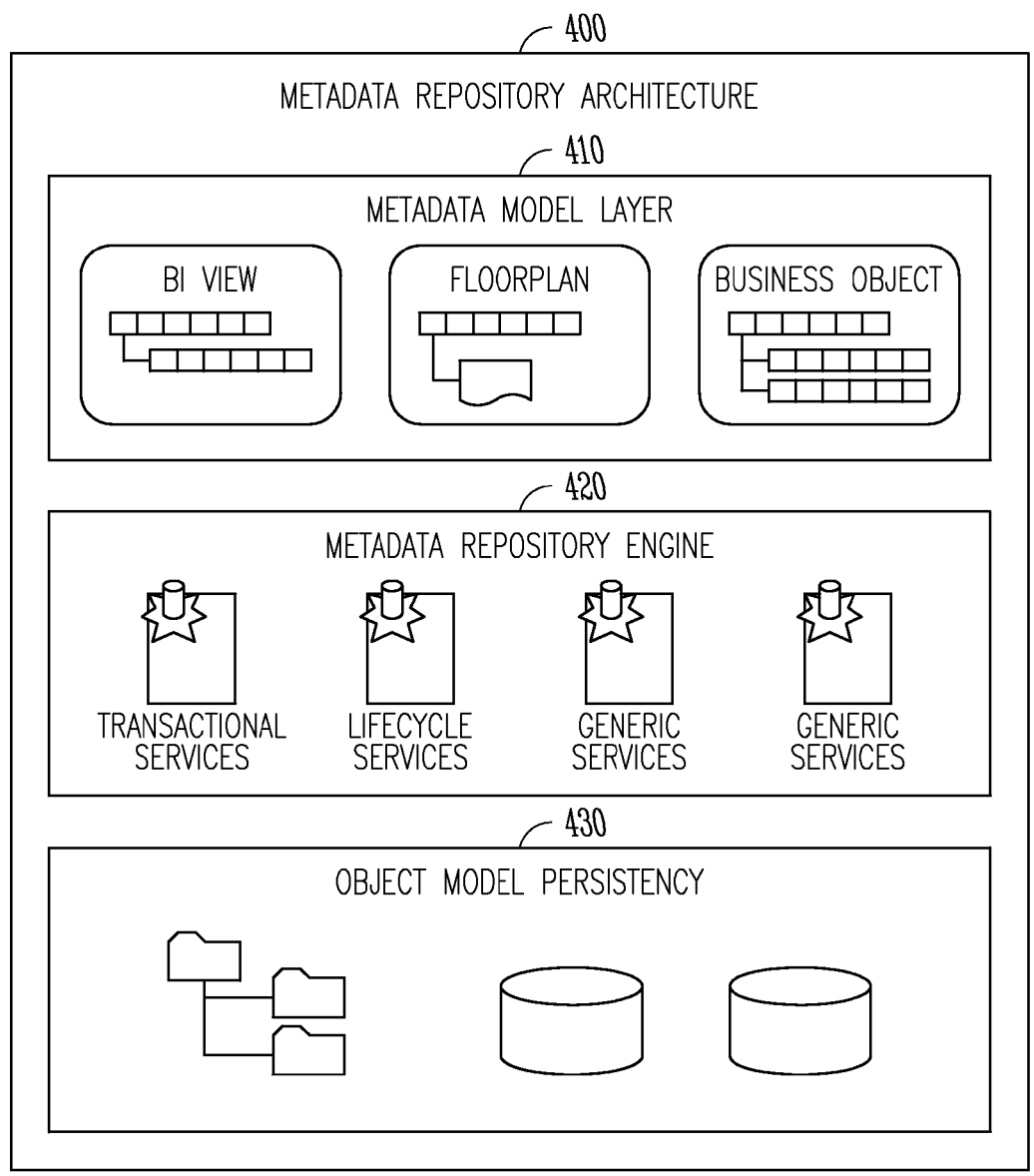
FIG. 4 is a block diagram of an example metadata repository architecture, in accordance with an example embodiment.

FIG. 4 is a block diagram of an example metadata repository architecture 400, in accordance with an example embodiment. FIG. 4 represents a logical architecture for describing some embodiments, and actual implementations may include more or different components arranged in any manner. The metadata repository architecture 400 may be implemented using any number of computer devices, metadata models, object models and/or model instances and may be embodied in any type(s) of electronic data structure(s), and one or more processors may execute program code to perform processes described herein.

The metadata repository architecture 400 may include a metadata model layer 410 and may include metadata models describing, respectively, generic models of a business intelligence (BI) view, a floorplan (i.e., a user interface (UI) layout), and a business object. An instance of the business object metadata model, for example, may comprise the SalesOrder object model or the Organization object model of FIG. 3. The metadata model layer 410 may be embodied in any type of data structure, including but not limited to eXtensible Markup Language (XML) files. Other metadata models that may reside in metadata model layer 410 may describe, for example, a work center, UI texts, and process components, but embodiments are not limited thereto. Metadata repository engine 420 may provide similar services to repository engine 330. Data structures representing the specific object models may be stored in object model persistency 430.

The metadata may be replicated from an optional metadata model repository of the registering networked solution and may be identical to the metadata used internally in the networked solution or may be a variant of the internal metadata suitable for a generic use among a plurality of networked solutions that exist in the landscape 228. In the latter case, the networked solution may need to transform the internal metadata structure of a particular networked solution to a generic external structure for networked solutions that access a registered business object type whose metadata is different from its internal definition of a metadata structure.

FIG. 5 is a low-level block diagram of an example landscape environment 500, in accordance with an example embodiment. The landscape environment includes software 512 installed on the customer's systems, such as computer systems located on the customer's premises, software 516 installed on a service provider's systems, such as software installed on a platform provided as a service (known as platform as a service), software 520 installed on a service provider's systems and offered as a licensed service (known as software as a service), and the like.

A hybrid migration planning service 524 comprises a component editor 528, a landscape directory 532, and a component and service repository 536, described more fully below. The hybrid migration planning service 524 enables a user to plan and execute an upgrade and/or migration, such as a software upgrade and/or migration, for one or more components and/or services of the landscape environment 500.

The landscape directory 532 maintains a directory of software and services registered in the landscape environment 500, as described above. For each component or service registered in the landscape environment 500, the landscape directory 532 maintains, for example, an identifier, a description, a version identifier, a date of installation, and the like for the corresponding software component or service. The component and service repository 536 comprises, for example, a name, a version, and an identifier for the components of the landscape directory 532 and may comprise metadata associated with one or more of the components, as described above by way of example in conjunction with FIG. 3. The component editor 528 is available for a user to, for example, define or publish component information to the component and service repository 536, such as a name, a version, a vendor (e.g., a provider of the component), a predecessor of a software component, and the like. A client components user interface 504 and a third-party components user interface 508 facilitates the definition or publication of the information to the component and service repository 536 via the component editor 528.

In one example embodiment, as noted above, the software 520 is licensed to a client as software-as-a-service. In this case, the licensed software-as-a-service 520 is selected and obtained from a service catalog 544 that maintains a list of services available from a service provider(s). Software that is selected from the service catalog 544 is registered with the landscape directory 532 and published to the component and service repository 536. The service catalog 544 may be continuously updated with new services.

Similarly, in one example embodiment, software 512 installed on the customer's system(s) and/or PaaS extensions 516 installed on a service provider's system(s) may be selected from a product catalog 540 maintained by a service and/or software provider. Software that is selected from the product catalog 540 is registered with the landscape directory 532, published to the component and service repository 536, and installed on a customer's system(s) and/or a PaaS accessible by the customer. In one example embodiment, the product catalog 540 includes software products from multiple vendors, including third-party vendors, and customer custom code. In one example embodiment, multiple product catalogs (not shown) are maintained for software products from third-party vendors and for customer custom code. The product catalog(s) 540 may be continuously updated with new products.

Figure 6A:
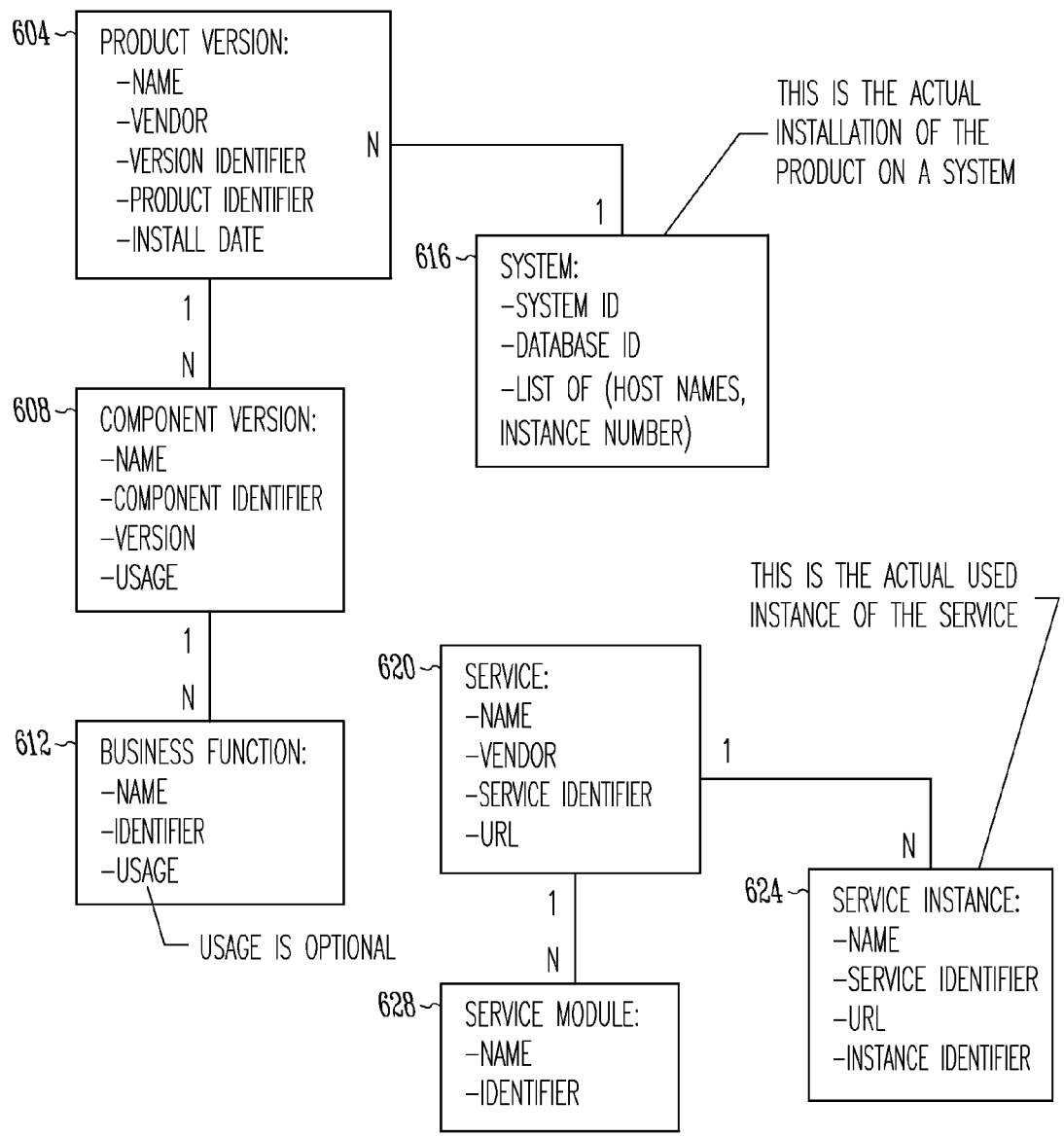
FIG. 6A is a logical diagram of the directory of software products and services maintained by the landscape directory, in accordance with an example embodiment.

FIG. 6A is a logical diagram of the directory of software products and services maintained by the landscape directory 532, in accordance with an example embodiment. For each software product, a product version object 604, one or more component version objects 608, and one or more business function objects 612 (for each component version object 608) are maintained.

The product version object 604 comprises a name, a vendor (e.g., a software provider), a version identifier, a product identifier, and installation date of the product. Each component version object 608 comprises a name, a component identifier, a version identifier, and usage information of the corresponding component. Each business function object 612 comprises a business function name, a business function identifier, and optional usage information of the corresponding business function. The system object 616 represents the actual installation of the product on a system and comprises a system identifier, a database identifier, and a list of one or more host names and one or more instance numbers. The usage information of the component version object 608 and the business function object 612 may be stored outside of the corresponding object.

For each software service, a service object 620, one or more service module objects 628, and one or more service instance objects 624 are maintained. Each service object 620 comprises a service name, a vendor (e.g., a service provider), a service identifier, and uniform resource locator (URL). Each service instance object 624 represents the actual instance of the service and comprises a service name, a service identifier, an instance identifier, and uniform resource locator (URL). Each service module object 628 comprises a service module name and a service module identifier.

Figure 6B:
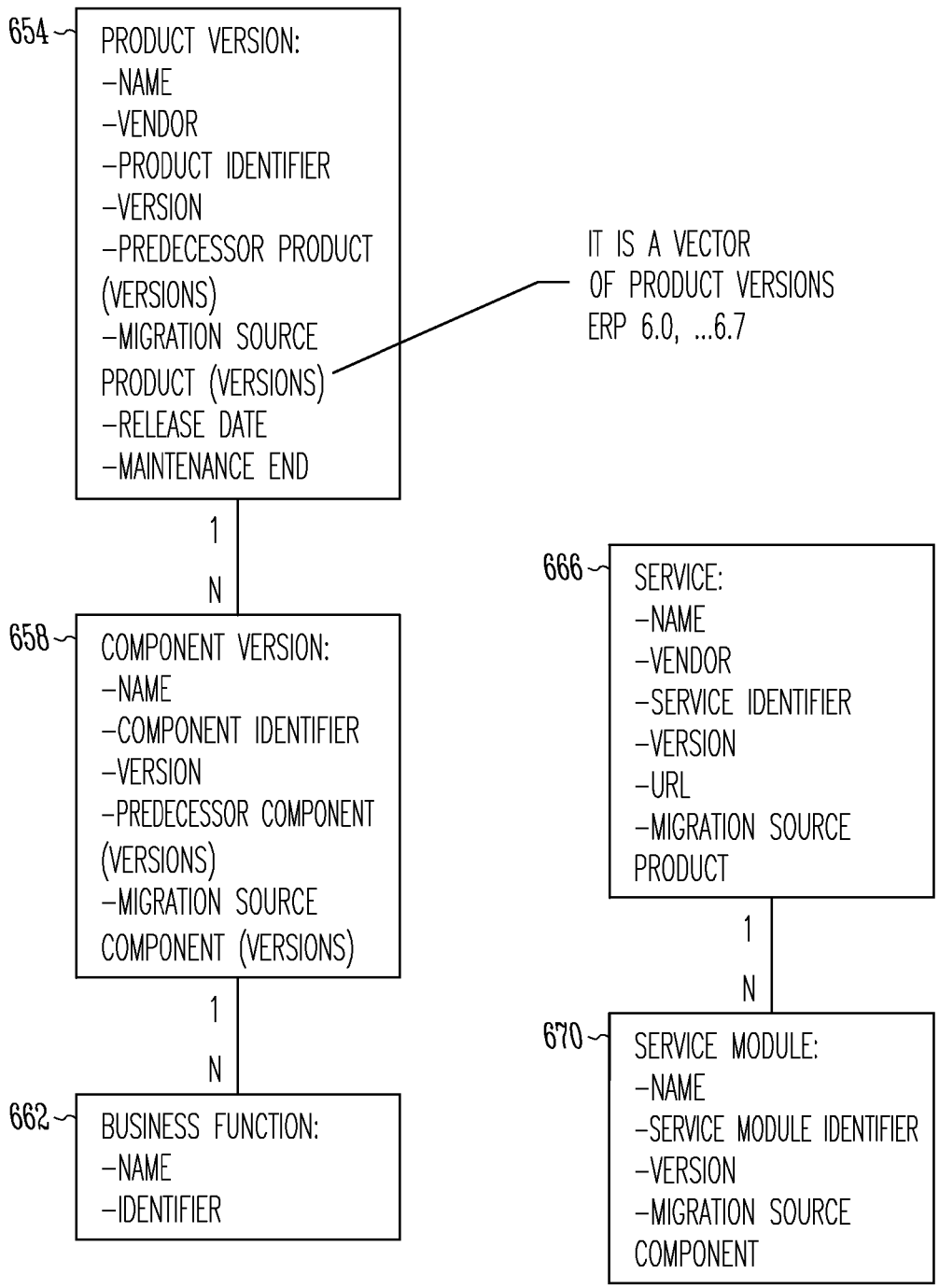
FIG. 6B is a logical diagram of the repository of software products and services maintained by a component and service repository, in accordance with an example embodiment.

FIG. 6B is a logical diagram of the repository of software products and services maintained by the component and service repository 536, in accordance with an example embodiment. For each software product, a product version object 654, one or more component version objects 658, and one or more business function objects 662 (for each component version object 658) are maintained.

The product version object 654 comprises a name, a vendor (e.g., a software provider), a product identifier, a version identifier, a predecessor product identifier (e.g., a predecessor version of the product), a migration source product (e.g., a specified version of the product), a release date of the product, and a maintenance end date. Each component version object 658 comprises a name, a component identifier, a version identifier, a predecessor component identifier (e.g., a predecessor version of the component), and a migration source product (e.g., a specified version of the component). Each business function object 662 comprises a business function name and a business function identifier.

For each software service, a service object 666 and one or more service module objects 670 are maintained. Each service object 666 comprises a service name, a vendor (e.g., a service provider), a service identifier, a version identifier, a uniform resource locator (URL), and a migration source product. Each service module object 670 comprises a service module name, a service module identifier, a service module version identifier, and a migration source component.

Figure 7:
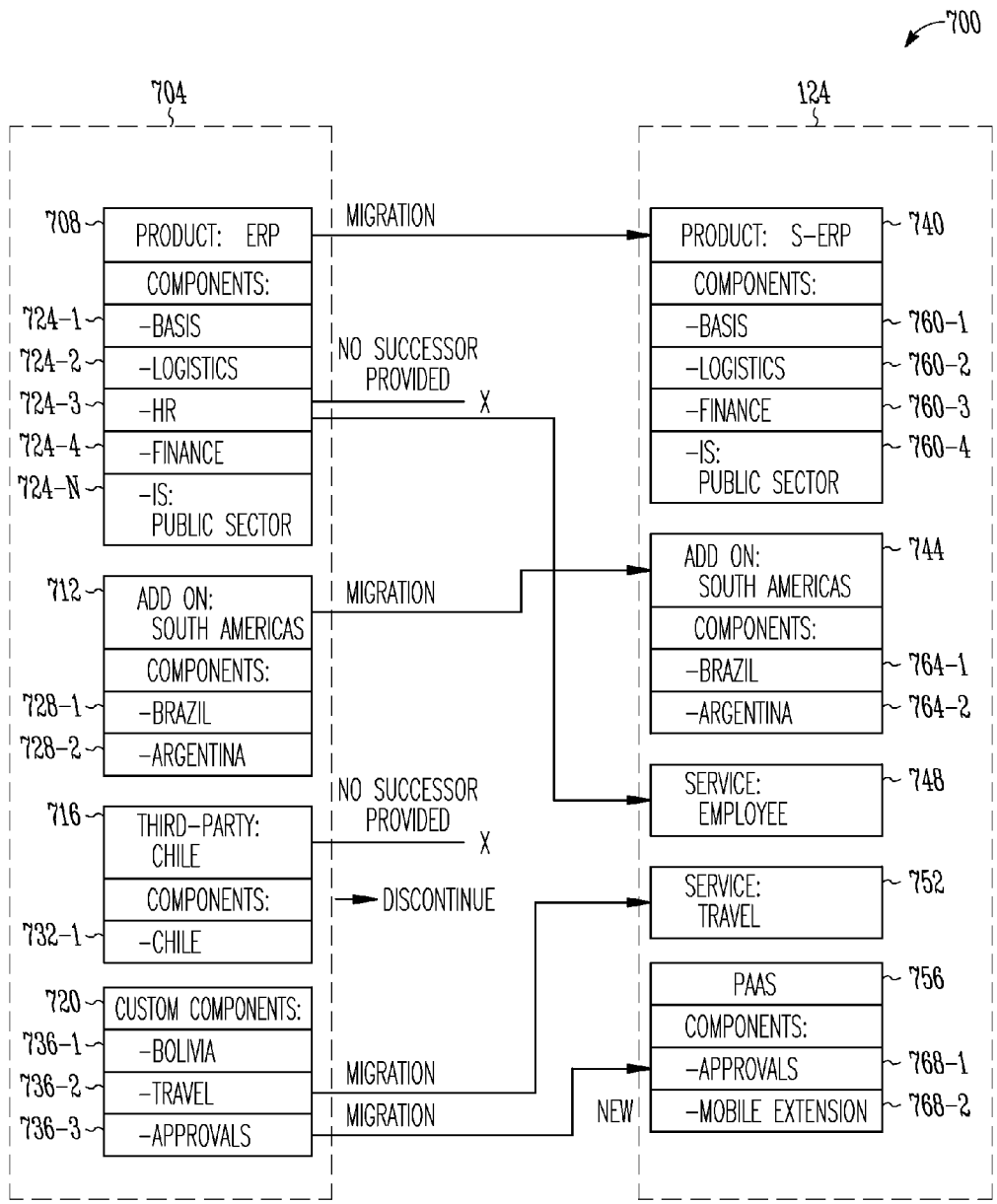
FIG. 7 is a graphical representation of an example planned migration, in accordance with an example embodiment.

FIG. 7 is a graphical representation of an example planned migration 700, in accordance with an example embodiment. In the example of FIG. 7, a source environment 704 comprises an enterprise resource planning product 708, add-on components 712, third-party components 716, and custom components 720. The enterprise resource planning product 708 comprises software components 724-1 through 724-N (hereinafter collectively known as software components 724) that each provide a defined application for the customer, such as a basis application 724-1, a logistics application 724-2, a human resources (HR) application 724-3, a finance application 724-4, and a public sector application 724-N. The add-on components 712 include software components 728-1 and 728-2 (hereinafter collectively known as software components 728) that each provide a defined application for the customer, such as, for example, a Brazilian compliance application 728-1 and an Argentinian compliance application 728-2. A compliance application 732-1 for Chile is provided, for example, by a third-party software provider and is thus a software component of the third-party components 716. The custom components 720 are owned by and/or licensed to the customer of the service provider and include a Bolivian compliance application 736-1, a travel application 736-2, and an approval process application 736-3.

As illustrated in FIG. 7, a migration path exists for most components, i.e., a version of the software component that is compatible with the target system 124 exists. For example, a migration path exists for the basis application 724-1 (i.e., basis application 760-1), the logistics application 724-2 (i.e., logistics application 760-2), the finance application 724-4 (i.e., finance application 760-3), the public sector application 724-N (i.e., public sector application 760-4), the Brazilian compliance application 728-1 (i.e., Brazilian compliance application 764-1), Argentinian compliance application 728-2 (i.e., Argentinian compliance application 764-2), and the approval process application 736-3 (i.e., approval process application 768-1). There are no identified product successors for the human resources application 724-3 in the enterprise resource planning product 708 and the Chilean compliance application 732-1 provided by the third-party software provider. A decision is made by the customer to discontinue maintenance of the Chilean compliance application 732-1. The hybrid migration planning service 524 has identified, however, an employee service 748 that may be migrated to as a replacement for the human resources application 724-3. Similarly, the hybrid migration planning service 524 has identified a travel service 752 that may be migrated to as a replacement for the travel application 736-2 owned by or licensed to the customer. In addition, the hybrid migration planning service 524 has determined that the approvals process application 736-3 owned by or licensed to the customer can be installed on a PaaS 756 offered by the service provider. In addition, the hybrid migration planning service 524 has determined that a new component provided by the customer, a mobile extension application 768-2, may be installed on the PaaS 756 offered by the service provider. The remaining components can be migrated to the new products identified by the hybrid migration planning service 524, as described above.

Figure 8A:
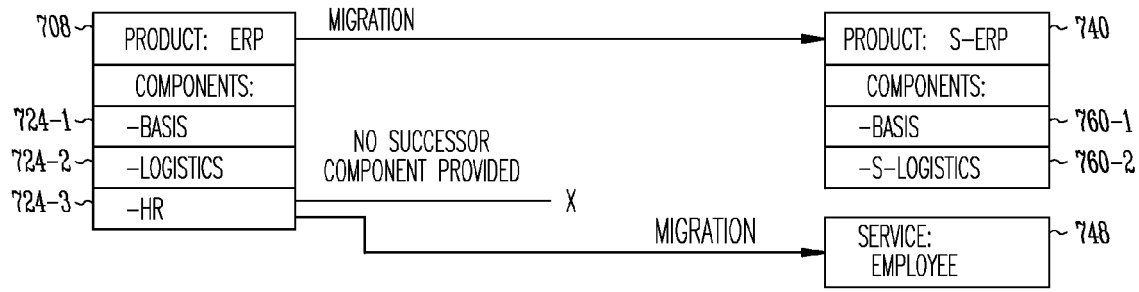
FIG. 8A is a graphical representation of a portion of the planned migration of FIG. 7, in accordance with an example embodiment.
Figure 8B:
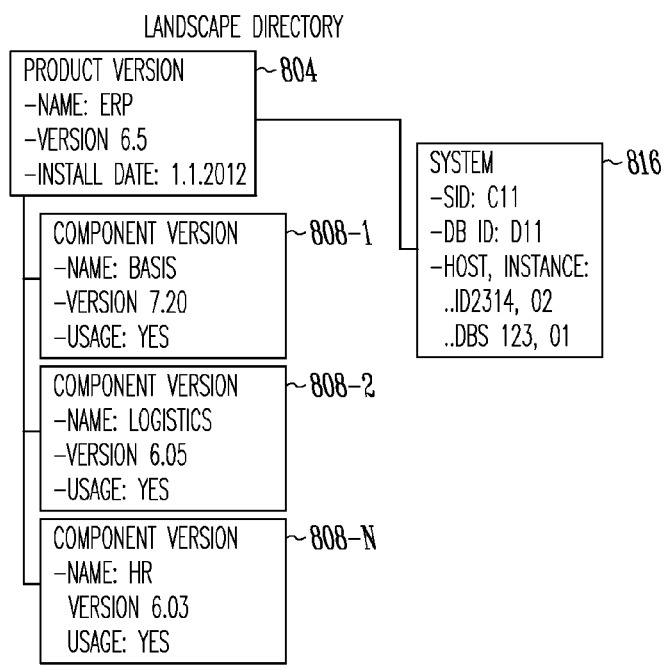
FIG. 8B is a logical diagram of the directory of software products and services maintained by the landscape directory for the portion of the planned migration depicted in FIG. 8A, in accordance with an example embodiment.

FIG. 8A is a graphical representation of a portion of the planned migration 700 of FIG. 7, in accordance with an example embodiment. FIG. 8B is a logical diagram of the directory of software products and services maintained by the landscape directory 532 for the portion of the planned migration 700 depicted in FIG. 8A, in accordance with an example embodiment. For the enterprise resource planning product 708, a product version object 804 and component version objects 808-1 through 808-N (hereinafter collectively known as component version objects 808) are maintained. In the example of FIG. 8B, the product version object 804 comprises a name, a version identifier, and an installation date of the product. Each component version object 808 comprises a name, a version identifier, and usage information of the corresponding component. The system object 816 comprises a system identifier, a database identifier, and a list of two host names and one or more instance numbers.

Figure 8C:
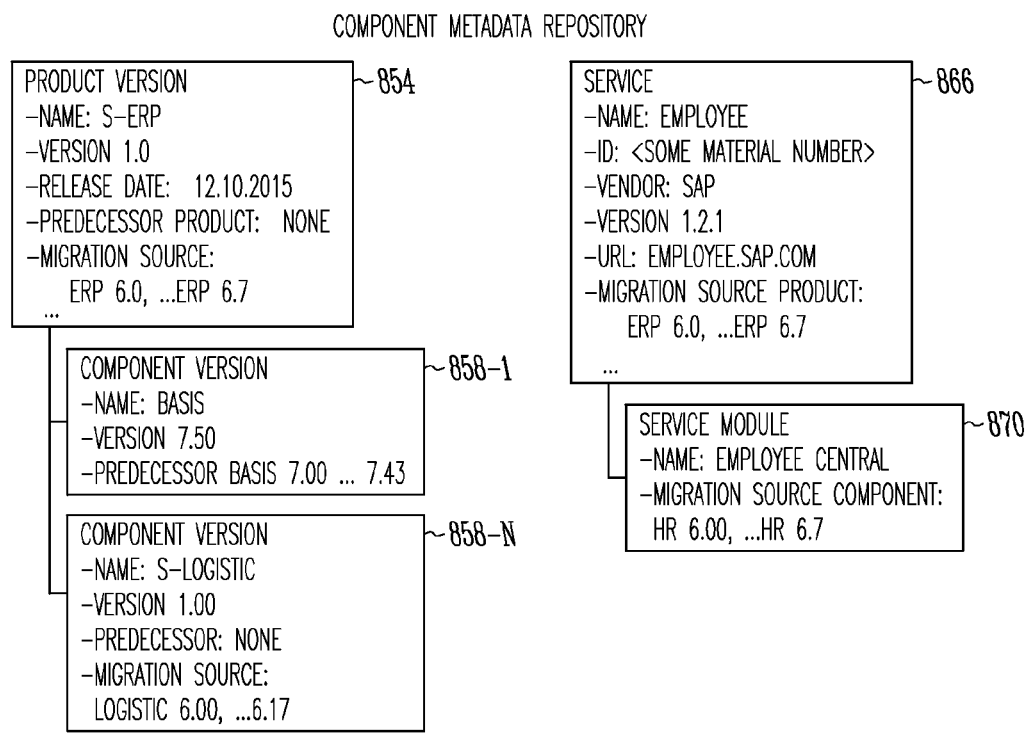
FIG. 8C is a logical diagram of the directory of software products and services maintained by the component and service repository for the portion of the planned migration depicted in FIG. 8A, in accordance with an example embodiment.

FIG. 8C is a logical diagram of the directory of software products and services maintained by the component and service repository 536 for the portion of the planned migration 700 depicted in FIG. 8A, in accordance with an example embodiment. For the s-ERP product 740, a product version object 854 and component version objects 858-1 through 858-N (hereinafter collectively known as component version objects 858) are maintained.

The product version object 854 comprises a name, a version identifier, a release date of the product, a predecessor product (e.g., a predecessor version of the product), and a migration source product (e.g., a specified version of the product). Each component version object 858 comprises a name, a version identifier, and a predecessor product (e.g., a predecessor version of the product). In addition, the component version object 858-N for the s-Logistic component comprises a migration source product.

For the employee software service, a service object 866 and a service module object 870 is maintained. The service object 866 comprises a service name, a service identifier, a vendor (i.e., service provider), a version identifier, a uniform resource locator (URL), and a migration source product. The service module object 870 comprises a service module name and a migration source component.

Figure 9:
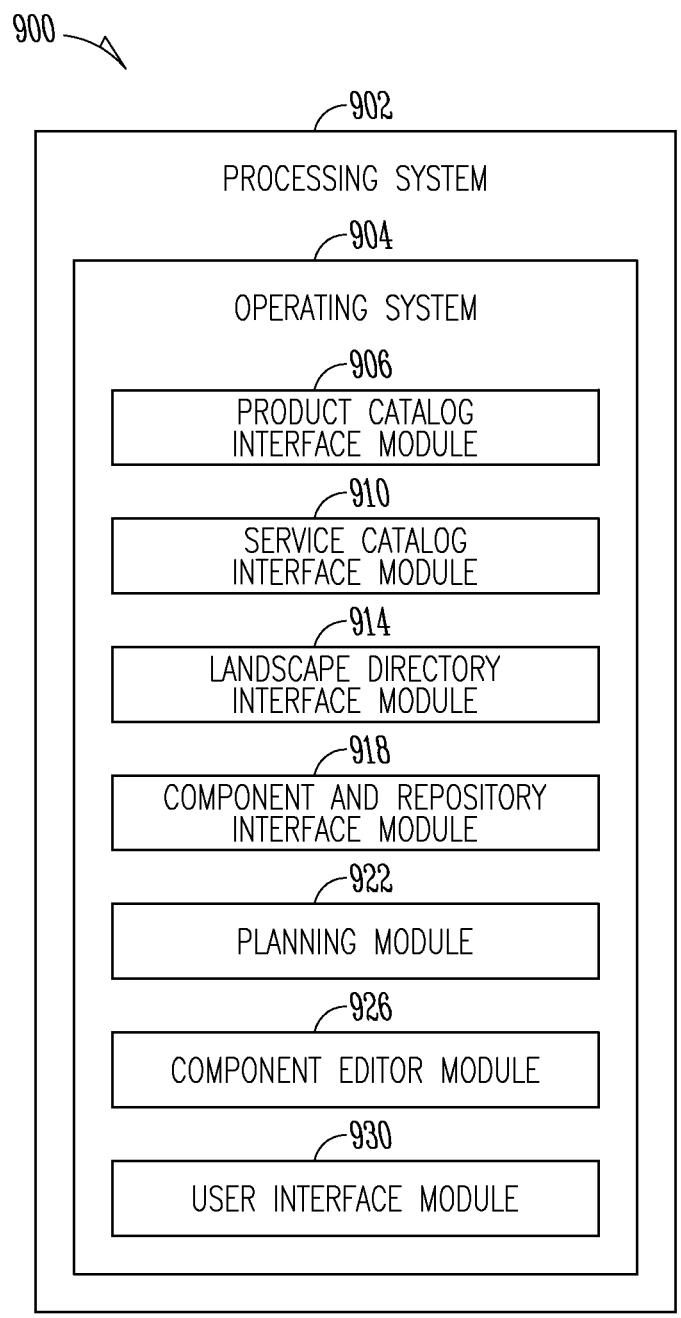
FIG. 9 is a block diagram of an example apparatus for planning a software upgrade and/or migration, in accordance an example embodiment.

FIG. 9 is a block diagram of an example apparatus 900 for planning a software upgrade and/or migration, in accordance an example embodiment. For example, the apparatus 900 may be used to implement the hybrid migration planning service 524. The apparatus 900 is shown to include a processing system 902 that may be implemented on a server, client, or other processing device that includes an operating system 904 for executing software instructions. In accordance with an example embodiment, the apparatus 900 includes a product catalog interface module 906, a service catalog interface module 910, a landscape directory interface module 914, a component and repository interface module 918, a planning module 922, a component editor module 926, and a user interface module 930.

The product catalog interface module 906 provides an interface to the product catalog 540 to, for example, enable the planning module 922 to identify software components that are suitable for the target system 124. For example, the planning module 922 may access the product catalog interface module 906 to determine that a version of the basis application 724-1 exists that is compatible with the target system 124.

The service catalog interface module 910 provides an interface to the service catalog 544 to, for example, enable the planning module 922 to identify software services that are suitable for the target system 124. For example, the planning module 922 may access the service catalog interface module 910 to determine that the employee service 748 is compatible with the target system 124.

The landscape directory interface module 914 provides an interface to the landscape directory 532 to, for example, enable the planning module 922 to determine the components of the source system 104. For example, the planning module 922 may determine that the source system 104 comprises the enterprise resource planning product 708, the add-on components 712, the third-party components 716, and the custom components 720.

The component and repository interface module 918 provides an interface to the component and service repository 536 to, for example, enable the planning module 922 to determine the details of the components of the source system 104. For example, the planning module 922 may access the component and repository interface module 918 to obtain details, such as the identification of the service provider, for the employee service 748.

The planning module 922 identifies software components and/or services that are suitable for the target system 124 based on the source system 104 and develops a plan for migrating from the source system 104 to the target system 124, as described below by way of example in conjunction with FIGS. 10A and 10B. The component editor module 926 enables a user to define, publish and/or modify component entries in the component and service repository 536. For example, a user may define the service name, the vendor, the version identifier, the service identifier, and the like for the employee service 748. The user interface module 930 enables a user to access the component editor module 926 and the planning module 922 in order to define, publish and/or modify component entries in the component and service repository 536 and to initiate a software upgrade and/or migration process.

Figure 10A:
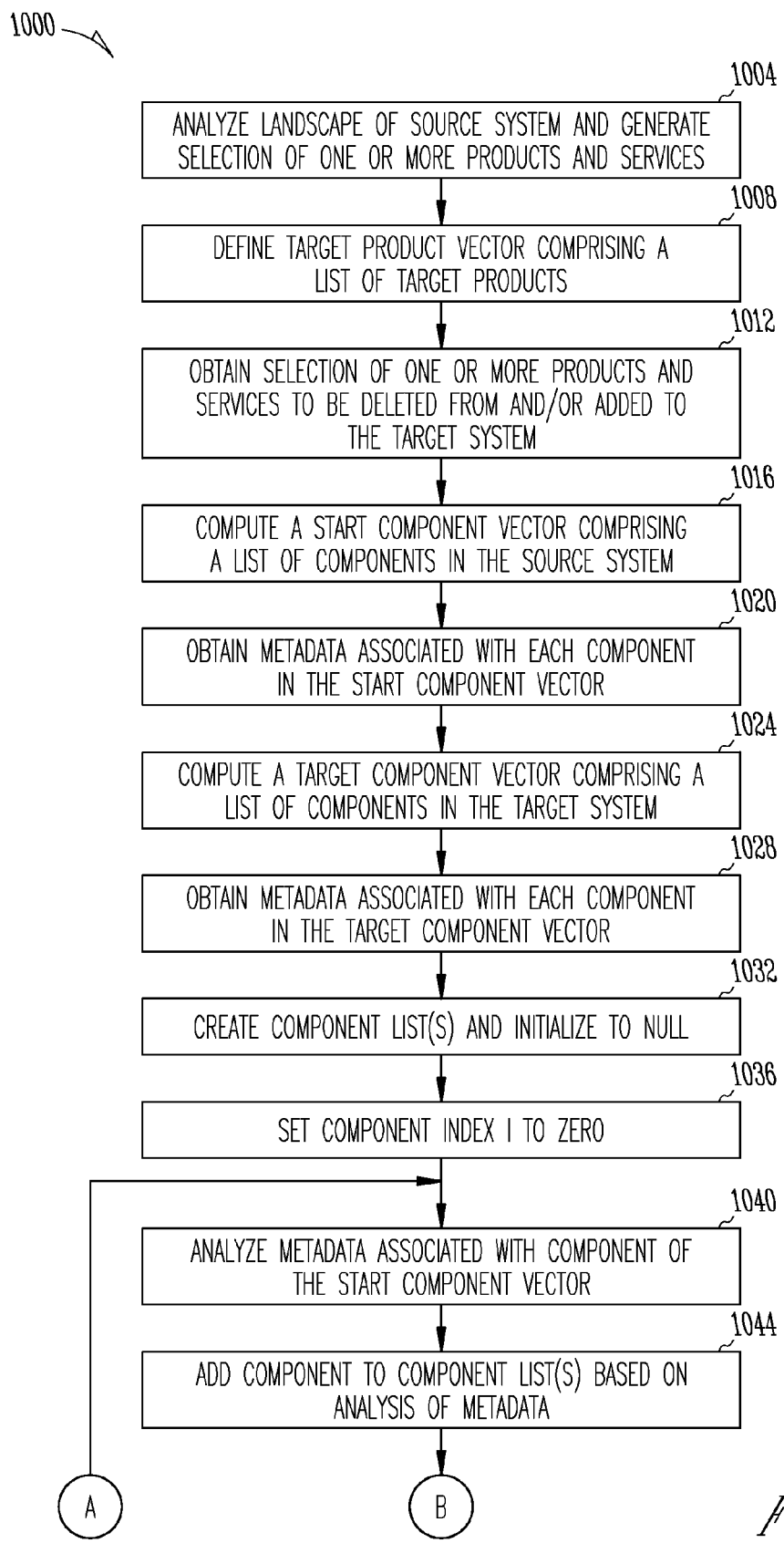
FIG. 10A and FIG. 10B show a flowchart of a method for planning a software upgrade and/or migration, in accordance with one example embodiment.
Figure 10B:
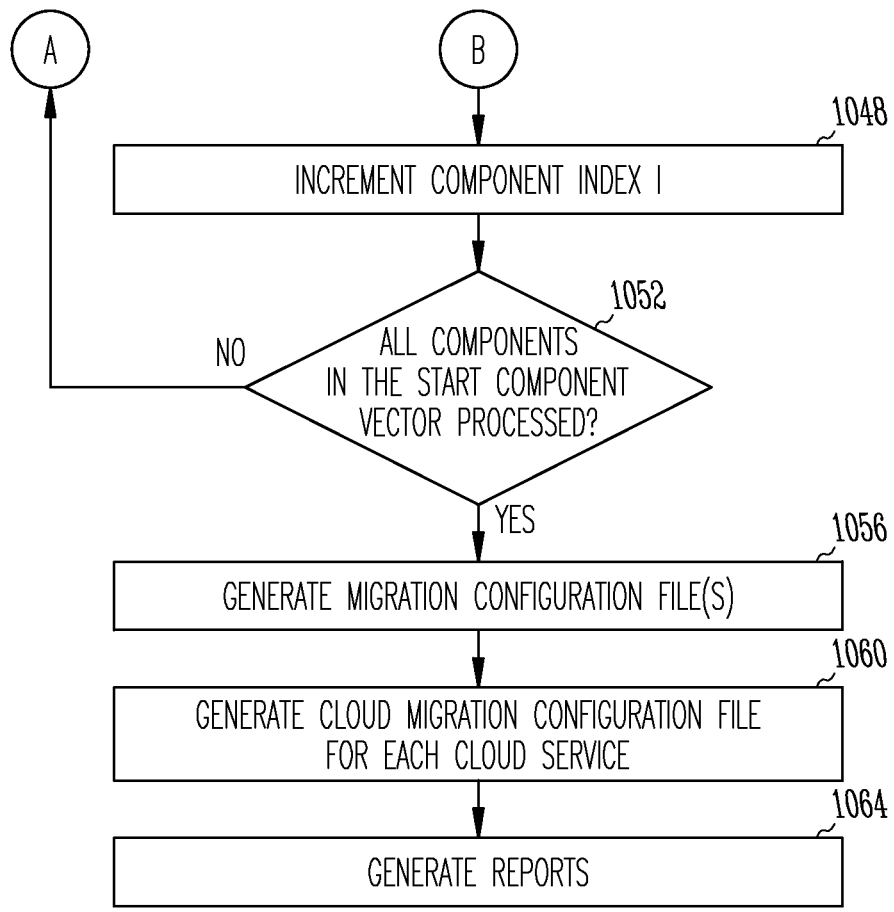

FIG. 10A and FIG. 10B show a flowchart of a method 1000 for planning a software upgrade and/or migration, in accordance with one example embodiment. In an example embodiment, one or more of the operations of the method 1000 may be performed by the planning module 922.

In an example embodiment, a landscape of the source system 104 is analyzed by accessing the landscape directory 220 and a selection of one or more products and services for the target system 124 is generated (operation 1004). In one example embodiment, the generated selection of one or more products and services for the target system 124 may be optionally revised by a user, such as a user of the source system 104, a client of the service provider, and the like. In one example embodiment, the selection of one or more products and services for the target system 124 is obtained from a user, such as a user of the source system 104 a client of the service provider, and the like. A target product vector comprising a list of products and/or services for the target system 124 is generated (operation 1008). The target product vector may include a corresponding version identifier of each of the target products and/or services. The target products can be, for example, a successor product, a migration target product, a new product, a service, and the like. As described more fully below, if a successor component (i.e., a component that is compatible with the target system 124)
is not available, the component may be deleted from the landscape, another product can be selected to replace the component, or a replacement component can be designated for development and deployment.

A selection of one or more products and services to be deleted from and/or added to the target system 124 is optionally obtained (operation 1012). The selection of one or more products and services to be deleted from and/or added to the target system 124 may be obtained from, for example, a user, such as a client of the hybrid migration planning service 524, in a situation where a successor component does not exist or is no longer needed.

A start component vector, comprising a list of components in the source system 104, is computed by the planning module 922 (operation 1016). The start component vector may be computed by accessing the component and service repository 536 based on the source system 104 and on the information in the landscape directory 532. Metadata associated with each component listed in the start component vector is obtained from the component and repository interface module 918 (operation 1020). In one example embodiment, the start component vector includes one or more services of the source system 104.

A target component vector comprising a list of components in the target system 124 is computed by the planning module 922 (operation 1024). The list of components in the target system 124 may be determined by accessing the product catalog 540 and/or the service catalog 544 based on the components of the start component vector. Metadata, such as the metadata described by way of example in conjunction with FIG. 6B, associated with each component listed in the target component vector is obtained from the component and repository interface module 918 (operation 1028).

In one example embodiment, one or more component lists are created and initialized to null (operation 1032). The component lists may include: an upgrade list that identifies components in the start component vector that have a successor in the target component vector; a migration list that identifies components in the start component vector that are a migration source of a component in the target component vector; and a list of uncovered components that identifies components in the start component vector that have no successor in the target component vector and are not a migration source of a component in the target component vector.

A component index i is set to zero (operation 1036) and an analysis of the metadata associated with the $i^{th}$ component of the start component vector is conducted to determine whether the $i^{th}$ component has a successor in the target component vector; is a migration source of a component in the target component vector; or has no successor in the target component vector and is not a migration source of a component in the target component vector (operation 1040). Based on the determination of operation 1040, the $i^{th}$ component is added to the appropriate component list(s) (operation 1044). For example, if the component has no successor, it is added to the list of components with no successor. The component index i is incremented (operation 1048) and a test is performed to determine if all components in the start component vector have been processed (operation 1052). If all components in the start component vector have not been processed, the method 1000 continues with operation 1040; otherwise, the migration configuration file(s) are generated (operation 1056). In one example embodiment, a migration configuration file for the customer maintained system(s), such as a customer system maintained on the customer's premises, is generated. The target product vector and the target component vector are also written to the migration configuration file. In one example embodiment, the migra-

```
<configuration group="Versions">
        <version type="Upgrade" name="SAPup" release="dev"
unicode="yes">42.000</version>
        <version type="Upgrade" name="EvalVersion">1</version>
        <version type="export" name="kernel">Jan 3 2011 22:34:48</version>
        <configuration group="Source">
                <version type="tool" name="disp+work" release="700" patchlevel="288"
bits="64" date="Jan 30 2011 20:28:55"/>
        </configuration>
        <configuration group="Destination">
                <version type="tool" name="disp+work" release="720" patchlevel="76"
bits="64" date="Jan 3 2011 22:34:48"/>
        </configuration>
        <configuration group="Components">
                <configuration group="Source">
                        <version type="R3" name="EA-APPL" release="600" patchlevel="0011"/>
                        <version type="R3" name="IS-H" release="600" patchlevel="0012"/>
                        <version type="R3" name="SAP__APPL" release="600" patchlevel="0011"/>
                        <version type="R3" name="SAP__BASIS" release="700" patchlevel="0014"/>
                        <version type="R3" name="SAP__BW" release="700" patchlevel="0016"/>
                        <version type="R3" name="SAP__HR" release="600" patchlevel="0022"/>
                </configuration>
                <configuration group="Destination">
                        <version type="R3" name="EA-APPL" release="600" patchlevel="0019"/>
                        <version type="R3" name="IS-H" release="600" patchlevel="0025"/>
                        <version type="R3" name="SAP__APPL" release="606" patchlevel="0000"/>
                        <version type="R3" name="SAP__BASIS" release="731" patchlevel="0000"/>
                        <version type="R3" name="SAP__BW" release="731" patchlevel="0000"/>
                        <version type="R3" name="SAP__HR" release="600" patchlevel="0064"/>
                </configuration>
        </configuration>
</configuration>
``` tion configuration file will be read by an upgrade tool to configure and/or determine which components to deploy in the target system 124. (It is noted that changes to services are typically scheduled; thus, a migration may be performed either before or after a change to a service has been implemented in order to avoid compatibility issues during the migration.)

In one example embodiment, a cloud migration configuration file is generated for each cloud service of the target system 124 (operation 1060). For example, the identification of the source components being the source of the migration may be written to a server and the target service and service modules. In one example embodiment, the cloud migration configuration file will be used by a human or a cloud migration tool to, for example, configure the cloud services of the target system 124.

In one example embodiment, informational reports on the upgrade and/or migration process are generated (operation 1064). The informational reports include:

1) a list of products and software components in the source system 104 and the target system 124, and the predecessor-successor link between the entities on the list (groups of them);
2) a list of products, services and components to purchase for the target system 124;
3) a list of components with no successor;
4) a list of components to be created for the target system 124;
5) a list of migration procedures from the source product to the target product, including the components deployed in each product and/or service;
6) a list of migration procedures from the source product to a SaaS component; and
7) a list of migration procedures from the source product to a customer component executed on a PaaS.

Figure 11:
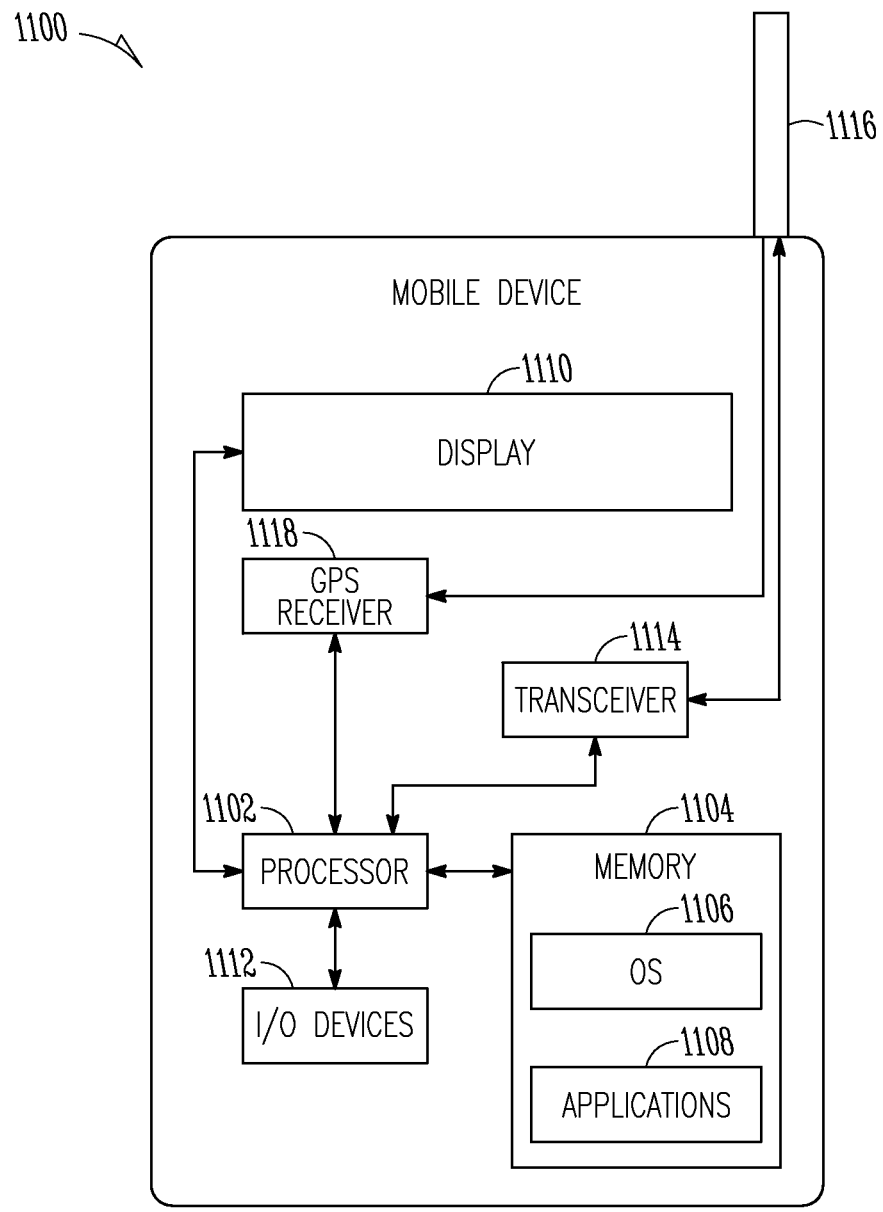
FIG. 11 is a block diagram illustrating a mobile device, according to an example embodiment.

In one example embodiment, a configuration file specifying the target component list includes the following:

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as applications 1108, such as a mobile location enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, and a microphone. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Figure 12:
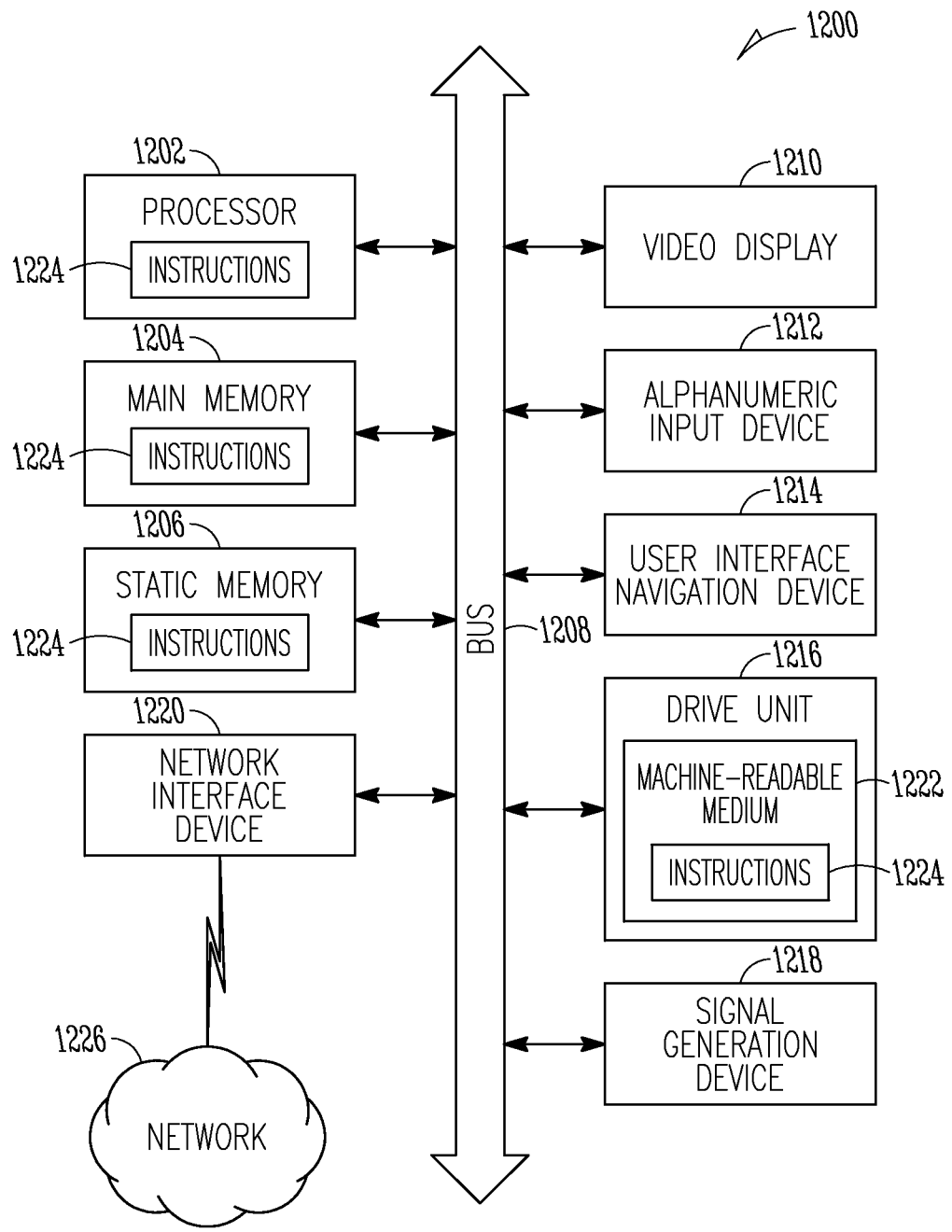
FIG. 12 is a block diagram of a computer processing system within which a set of instructions may be executed for causing a computer to perform any one or more of the methodologies discussed herein.

FIG. 12 is a block diagram of a computer processing system 1200 within which a set of instructions 1224 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1200 includes a processor 1202 (e.g., a central processing unit (CPU), a graphics processing unit (GPU), or both), a main memory 1204, and a static memory 1206, which communicate with each other via a bus 1208. The computer processing system 1200 may further include a video display 1210 (e.g., a plasma display, a liquid crystal display (LCD), or a cathode ray tube (CRT)). The computer processing system 1200 also includes an alphanumeric input device 1212 (e.g., a keyboard), a user interface (UI) navigation device 1214 (e.g., a mouse and/or touch screen), a drive unit 1216, a signal generation device 1218 (e.g., a speaker), and a network interface device 1220.

The drive unit 1216 includes a machine-readable medium 1222 on which is stored one or more sets of instructions 1224 and data structures embodying or utilized by any one or more of the methodologies or functions described herein. The instructions 1224 may also reside, completely or at least partially, within the main memory 1204, the static memory 1206, and/or within the processor 1202 during execution thereof by the computer processing system 1200, the main memory 1204, the static memory 1206, and the processor 1202 also constituting tangible machine-readable media 1222.

The instructions 1224 may further be transmitted or received over a network 1226 via the network interface device 1220 utilizing any one of a number of well-known transfer protocols (e.g., Hypertext Transfer Protocol).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions 1224. The term "machine-readable medium" shall also be taken to include any medium that is capable of storing, encoding, or carrying a set of instructions 1224 for execution by the computer and that cause the computer to perform any one or more of the methodologies of the present application, or that is capable of storing, encoding, or carrying data structures utilized by or associated with such a set of instructions 1224. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method, comprising:
   generating, using at least one hardware processor, a selection of one or more software entities;
   defining, using the at least one hardware processor, a target product vector based on the selection of the one or more software entities;
   obtaining, from a database, a landscape from a landscape directory stored in the database, the landscape identifying components of a source system;
   computing, using the at least one hardware processor, a start component vector based on the obtained landscape of the source system;
   computing, using the at least one hardware processor, a target component vector based on the start component vector and the target product vector, wherein the computing the target component vector comprises accessing a component and service repository based on the start component vector and obtaining metadata associated with at least one component of the target component vector;
   determining, using the at least one hardware processor, whether a selected component of the target component vector is a successor of a selected component of the start component vector;
   determining whether the selected component of the start component vector has no successor component in the target component vector and is not a migration source of the component of the target component vector; and
   generating, using the at least one hardware processor, one or more migration files comprising the target product vector and the target component vector based on the determinations.

2. The method of claim 1, further comprising determining whether the selected component of the start component vector is a migration source of a component in the target component vector.

3. The method of claim 1, further comprising obtaining a successor component for the selected component of the start component vector.

4. The method of claim 1, further comprising obtaining an identification of a software entity to be deleted from or added to the source system.

5. The method of claim 1, further comprising generating one or more migration configuration files based on the target component vector.

6. The method of claim 1, wherein defining the target product vector further comprises analyzing the landscape of the source system.

7. The method of claim 1, wherein the computation of the start component vector further comprises:
    accessing the component and service repository based on the landscape directory and the source system; and
    obtaining metadata associated with at least one component of the start component vector.

8. An apparatus, the apparatus comprising:
    a processor;
    memory to store instructions that, when executed by the processor cause the processor to perform operations comprising:
    generating a selection of one or more software entities,
    defining a target product vector based on the selection of one or more software entities;
    obtaining, from a database, a landscape from a landscape directory, the landscape identifying components of a source system stored in the database;
    computing a start component vector based on the obtained landscape of the source system;
    computing a target component vector based on the start component vector and target product vector, wherein the computing the target component vector comprises accessing a component and service repository based on the start component vector and obtaining metadata associated with at least one component of the target component vector;
    determining whether a selected component of the target component vector is a successor of a selected component of the start component vector;
    determining whether the selected component of the start component vector has no successor component in the target component vector and is not a migration source of the component of the target component vector; and
    generating one or more migration files comprising the target product vector and the target component vector based on the determinations.

9. The apparatus of claim 8, the operations further comprising determining whether the selected component of the start component vector is a migration source of a component in the target component vector.

10. The apparatus of claim 8 the operations further comprising determining whether the selected component of the start component vector has no successor component in the target component vector and is not a migration source of a component in the target component vector.

11. The apparatus of claim 10, the operations further comprising obtaining a successor component for the selected component of the start component vector.

12. The apparatus of claim 8, the operations further comprising obtaining an identification of a software entity to be deleted from or added to the source system.

13. The apparatus of claim 8, the operations further comprising generating one or more migration configuration files based on the target component vector.

14. The apparatus of claim 8, wherein defining the target product vector further comprises analyzing the landscape of the source system.

15. The apparatus of claim 8, wherein the computation of the start component vector further comprises:
    accessing the component and service repository based on the landscape directory and the source system; and
    obtaining metadata associated with at least one component of the start component vector.

16. A non-transitory computer-readable medium embodying instructions that, when executed by a processor perform operations comprising:
    generating a selection of one or more software entities;
    defining a target product vector based on the selection of one or more software entities;
    obtaining, from a database, a landscape from a landscape directory, the landscape identifying components of a source system stored in the database;
    computing a start component vector based on the obtained landscape of the source system;
    computing a target component vector based on the start component vector and target product vector, wherein the computing the target component vector comprises accessing a component and service repository based on the start component vector and obtaining metadata associated with at least one component of the target component vector;
    determining whether a selected component of the target component vector is a successor of a selected component of the start component vector;
    determining whether the selected component of the start component vector has no successor component in the target component vector and is not a migration source of the component of the target component vector; and
    generating one or more migration files comprising the target product vector and the target component vector based on the determinations.

17. The non-transitory computer-readable medium of claim 16, the operations further comprising determining whether the selected component of the start component vector is a migration source of a component in the target component vector.

* * * * *